United States Patent Office 3,379,654
Patented Apr. 23, 1968

3,379,654
PROCESS FOR THE PREPARATION OF EPOXY-GROUP CONTAINING PREPOLYMERS FROM POLYEPOXY COMPOUNDS
Wolfgang Seiz, Basel, Switzerland, assignor to Ciba Limited, Basel, Switzerland, a Swiss company
No Drawing. Filed Oct. 14, 1964, Ser. No. 403,904
Claims priority, application Switzerland, Oct. 18, 1963, 12,794/63
9 Claims. (Cl. 260—2)

ABSTRACT OF THE DISCLOSURE

Curable prepolymers are prepared by heating at elevated temperatures polyepoxides having a softening point not exceeding about 50° C. and a 1,2-epoxide equivalency greater than 1 in the presence of a titanic acid ester or aluminum alcoholate or of a complex or chelate compound of titanium or aluminum with a β-dicarbonyl compound.

It is known that when cycloaliphatic polyepoxy compounds are cured with suitable curing agents, such as polycarboxylic acid anhydrides, there are obtained products that display—in comparison with products obtained by curing conventional epoxy resins, especially the polyglycidyl ethers of polyphenols—the advantage of higher heat distortion points. However, in the past cycloaliphatic polyepoxides were used on a major industrial scale only as casting resins and adhesives, although their high heat distortion points are very desirable also in the sphere of moulding compositions and laminates. This is due to the fact that as a rule cycloaliphatic polyepoxides are defined compounds of a relatively low molecular weight and are either liquid at room temperature or possess a sharp melting point or a tight plasticity range, that is to say their structural stability is insufficient for the manufacture of mouldings or laminates in a press at an elevated temperature.

It has now been found that the prepolymerization of cycloaliphatic polyepoxides that are at room temperature either liquid or highly viscous or have a low softening point, in the presence of a titanic acid ester or aluminum alcoholate or of a complex or chelate compound of titanium or aluminum with a β-dicarbonyl compound, leads to dimeric or polymeric, soluble curable and fusible precondensates that contain a residuum of epoxide groups and possess a broad plasticity range. Such precondensates display an excellent structural stability and are, moreover, distinguished by their minor shrinkage during pressing so that they are eminently suitable for the manufacture of moulding compositions and laminating resin masses.

Accordingly, the present invention provides a process for the manufacture of curable and fusible prepolymers that are soluble in solvents and contain a residuum of epoxide groups, suitable for the productiton of coatings, castings, mouldings and adhesives and as interlayer material for laminates, more especially as bonding agents in laminates reinforced by fibrous materials, as well as for the manufacture of moulding compositions.

According to the present process a cycloaliphatic polyepoxy compound, which has a softening point not exceeding about 50° C. and has an epoxide equivalence greater than 1, is reacted at an elevated temperature, in the presence of a metal compound that contains at least one grouping

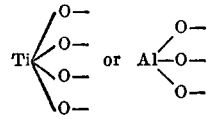

in which the titanium or aluminum atom may be incorporated by one or several coordinative side-valence bonds as a central atom in an organic metal complex compound or metal chelate compound, until the desired polymerization degree [which is recognized by the diminution of the epoxide group content of the reaction mixture] has been reached and the reaction is then discontinued at the latest before gelling sets in.

The cycloaliphatic polyepoxy compounds to be used in the present process are in general liquid or highly viscous at room temperature, though alternatively there may be used cycloaliphatic polyepoxides that are solid at room temperature and whose softening point—that is to say the temperature at which in the special test gear according to DIN 53 180 the mercury column pierces the resin powder layer—is at most about 50° C.

As examples of suitable cycloaliphatic polyepoxy compounds there may be mentioned:

Vinylcyclohexenediepoxide, limonene diepoxide,
(3,4-epoxy-cyclohexylmethyl)-3,4-epoxy-cyclohexane-carboxylate,
(3,4-epoxy-6-methyl-cyclohexylmethyl)-3,4-epoxy-6-methylcyclohexanecarboxylate,
ethyleneglycol-bis(4-oxatetracyclo(6.2.1.0$^{2,7}$0$^{3,5}$)hendec-9-yl)ether,
glycerol-bis(4-oxatetracyclo(6.2.1.0$^{2,7}$0$^{3,5}$)hendec-9-yl) ether,
(4-oxatetracyclo(6.2.1.0$^{2,7}$0$^{3,5}$)hendec-9-yl)glycidyl ether,
3-(3',4'-epoxycyclohexyl)-9,10-epoxy-2,4-dioxaspiro (5.5)undecane, and
3-(3',4'-epoxy-6-methyl-cyclohexyl)-9,10-epoxy-7-methyl-2,4-dioxaspiro(5.5)undecane.

As metal compounds to be used as catalysts in the present process (and which contain at least one grouping

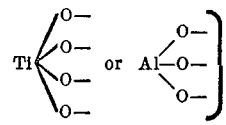

there are suitable titanic acid esters or polymeric titanic acid esters of the formula

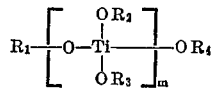

where $R_1$ to $R_4$ each represents an organic radical, for example an aliphatic, cycloaliphatic, araliphatic, aromatic or heterocyclic radical and $m$ is an integer. As relevant examples there may be mentioned: Tetraphenyltitanate, tetramethyltitanate, tetraethyltitanate, tetraisopropyltitanate, tetra-n-butyltitanate, tetradecyltitanate, octyleneglycoltitanate; polymeric alkyltitanates; tetra(hydroxyethyl)titanate, tetra(hydroxybutyl)titanate, tetra(aminoethyl)titanate and tetra(methyl-aminobutyl)titanate. Processes for the manufacture of such titanates have been described in U.S. specification No. 2,672,455.

There are also suitable titanic acid esters obtained by total or partial transesterification of tetraalkyltitanates, such as tetra-isopropyltitanate or tetra-n-butyltitanate, with a higher monohydric or polyhydric alcohol, such as polyethyleneglycol, polypropyleneglycol, 4-oxatetracyclo (6.2.1.0$^{2,7}$0$^{3,5}$)hendecan-9-ol or 4-hydroxy-2-sulfolenes.

Further suitable are aluminum alcoholates, such as aluminum isopropylate or aluminum butylate, also complex or chelate compounds that contain titanium or aluminum. Such complexes and chelates are obtained, for example, when an aluminum alcoholate, such as aluminum ethylate or a titanic acid ester, for example tetrabutyltitanate or the titanic acid ester of the formula $(H_9C_4O)_3$ TiO—$C_2H_4$—O—Ti$(OC_4H_9)_3$, is reacted with a β-dicarbonyl compound such as acetylacetone, benzoylacetone, 3-methylpentane-2,2-dione, 3 - benzoylpentane-2,4 - dione, ω-propionylacetophenone, ω-butyrylacetophenone, or acetoacetate such as acetoacetic ester, propylacetoacetate, butylacetoacetate, (4-oxatetracyclo(6.2.1.0$^{2,7}$0$^{3,5}$)hendec-9-yl)acetoacetate or 4 - (3',4'-epoxy-cyclohexyl)-3,5-dioxacyclohexyl-acetoacetate.

The amount of metal-containing catalyst to be added depends in the known manner on the desired progress of the reaction or the polymerization degree to be reached. Advantageously, there are used about 0.1 to 15% by weight of catalyst, referred to the weight of the cycloaliphatic polyepoxide; the whole of the catalyst may be added at the start or it may be added in portions during the progress of the polymerization.

The reaction may be performed by simply heating the mixture of the cycloaliphatic epoxide with the titanium or aluminum catalyst, for example at a temperature from 50° to 300° C., preferably from about 80° to 160° C., the heating being continued until the epoxide group content has dropped to the desired level and the viscosity of the batch has risen as a function of the increased polymerization degree. The polymerization must never be taken to the point where gelling sets in. The reaction can advantageously be terminated by rapid cooling. In general, the reaction is only taken to a point where the content of epoxide groups has dropped to about half the original value, or, respectively, where the epoxide equivalence weight of the polymerized product has become about double the epoxide equivalence weight of the starting material. In actual practice the content of epoxide groups of the dimerized or polymerized products will as a rule vary from about 0% to 80%, preferably from 50% to 70%, of the original content of epoxide groups of the starting material.

The reaction is advantageously conducted under atmospheric pressure though in certain cases a vacuum or superatmospheric pressure may be applied. The reaction may be performed in the presence or absence of inert solvents or diluents.

The products obtained by the present process are epoxy resins that are solid at room temperature and are still soluble and still fusible. They may be cured either by simple heating—with the titanium or aluminum catalyst acting at the same time as curing agents—or by addition of a conventional curing agent.

As examples of the curing agents referred to above there may be mentioned: Amines or amides such as aliphatic and aromatic primary, secondary and tertiary amines, for example meta-phenylenediamine, para-phenylenediamine, bis(para-aminophenyl)methane, bis(para-aminophenyl)sulfone, ethylenediamine, N,N-diethylethylenediamine, diethylenetriamine, tetra(hydroxyethyl)diethylenetriamine, triethylenetetramine, N,N - dimethylpropylenediamine, Mannich's bases such as tris(dimethylaminomethyl)phenol, dicyandiamide, urea-formaldehyde resins, melamine-formaldehyde resin; polyamides, for example those from aliphatic polyamines and dimerized or trimerized unsaturated fatty acids, polyphenols, for example resorcinol, bis(4 - hydroxy-phenyl)dimethylmethane, phenolaldehyde resins, reaction products of aluminum alcoholates or phenolates with compounds of tautomeric reaction of the type of acetoacetatic ester, Friedel-Crafts catalysts, for example aluminum chloride, antimony pentachloride, tin tetrachloride or zinc chloride; especially suitable are boron trifluoride hydrate and complexes of boron trifluoride with organic compounds, such as amines, ethers or alcohols, for example boron trifluoride-ethylamine complex; metal fluoborates such as the fluoborates of zinc, nickel or calcium; boroxines such as trimethoxyboroxine, and especially polybasic carboxylic acids and their anhydrides, for example phtalic anhydride, methyl endomethylene tetrahydrophthalic anhydride, dodecenyl succinic acid anhydride, hexahydrophtalic acid anhydride, hexachloro endomethylene tetrahydrophthalic acid anhydride or endomethylene tetrahydrophthalic acid anhydride or their mixtures; maleic or succinic acid anhydride. If desired there may additionally be used accelerators, such as tertiary amines, tin$^{II}$ fatty acid salts, alkali metal alcoholates, also polyhydroxy compounds such as hexanetriol or glycerol.

The term "curing" as used in this context designates the conversion of the polymeric fusible precondensate into an insoluble and infusible resin.

The curable precondensates or their mixtures with curing agents can also be admixed, at any stage prior to curing, with fillers, plasticizers, pigments, dyestuffs, flame-inhibitors or mould lubricants.

The curable precondensates obtained by the present process are particularly suitable for use as bonding agents in laminates reinforced with fibrous materials.

Suitable fibrous materials are fibers or fabrics of glass, polyesters, nylon, polyacrylonitrile, silk, linen or cotton, also glass fiber matting, paper, asbestos paper, mica flakes, cottonwool or canvas.

The precondensates manufactured by the present process are also very suitable for use in moulding compositions, for which purpose they are admixed with fillers and/or reinforcing materials.

Both inorganic and organic substances are suitable as fillers. There may be mentioned china clay (Bolus alba), calcined kaoline (registered trademark "Molochite"), quartz meal, ground chalk, slate powder, steatite, cellulose or wood meal. The amount of filler contained in the moulding composition is in general from about 40% to 190% referred to the weight of synthetic resin used; it depends on the type of filler and the properties the moulding composition, or the mouldings made from it, is/are desired to have.

Suitable reinforcing materials are glass fibers, as well as organic fibers, such as cotton, polyamide or polyacrylonitrile fibers.

The mixing of the precondensate with the curing agent and the filler may be performed in the conventional mixers, such, for example, as a roller mixer. Apart from fillers there may also be added dyestuffs, pigments, inert mould lubricants and other modifying substances. The precondensates of the present invention may also be used for the manufacture of eddy sinter powders, adhesives, casting resins and insulating materials for the electrical industry.

Percentages in the following examples are by weight.

The chelate compounds of titanium and of aluminum used as catalysts in the examples were prepared in the following manner:

(I) In a distillation apparatus a mixture is prepared from 300 g. of acetoacetate of 4-oxatetracyclo(6.2.1. 0$^{2,7}$0$^{3,5}$)hendecan-9-ol [prepared as described below] and 356 g. of a titanic acid ester of the formula

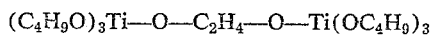

obtained by transesterification of tetra-n-butyltitanate with ethyleneglycol. An exothermic reaction sets in and the temperature rises within 3 minutes from 24° to 37° C. A total of 88 g. of butanol formed is then distilled off, initially under a vacuum of 10 mm. Hg and then under a high vacuum at an internal temperature of 70° C. As radical there are obtained 566 g. of the chelate in the form of a thickly liquid dark-red syrup containing 2.08 expoxide equivalents per kg.

The titanium chelate (I) has the following probable structural formula

The aluminum chelate formed (II) corresponds to the probable structural formula

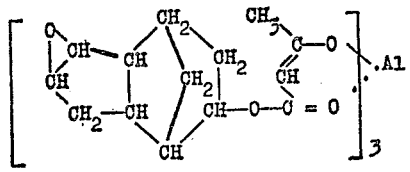

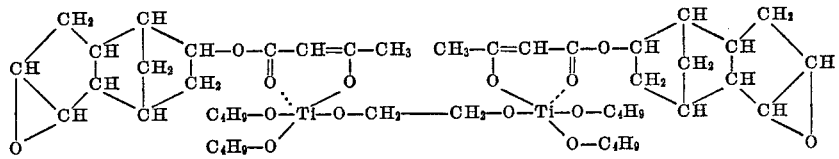

The acetoacetate was prepared in the following manner:

In a reactor equipped with agitator, thermometer, reflux condenser and dropping funnel 249 g. of 4-oxatetrahydro(6.2.1.0$^{2,7}$0$^{3,5}$)hendecan-9-ol of the formula

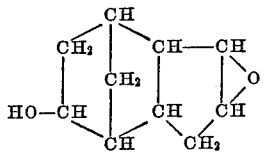

are mixed with 0.5 g. of triethylamine. The mixture is then heated to 60° C. and within 2 hours 129 g. of diketene are added through the dropping funnel, while maintaining the temperature at 60° C. to 68° C. by cooling. When all diketene has been added, this temperature is maintained for another ½ hour. The volatile material (1 g.) is then distilled out of the reaction product at 70° C. under 10 mm. Hg, to leave 372 g. of an orange-coloured liquid having a viscosity of 271 centipoises at 25° C. and containing 3.93 epoxide equivalents per kg. After standing for several weeks the product has become crystalline. The pure acetoacetate of the formula

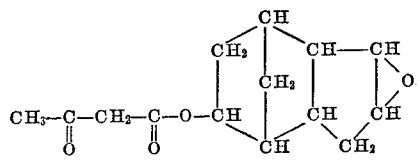

obtained by recrystallization from alcohol melts at 62.8° to 63° C. and contains 4.02 epoxide equivalents per kg. (theory: 4.0).

(II) A mixture of 150 parts of the acetoacetate of 4-oxatetracyclo(6.2.1.0$^{2,7}$0$^{3,5}$)hendecan-9-ol, 41 g. of aluminum isopropylate and 50 g. of xylene is heated for 1½ hours at 60° to 70° C. in a reactor equipped with an agitator, and the isopropanol formed by the reaction is continuously expelled under a vacuum of about 100 mg. Hg. Finally, the xylene added is removed under a vacuum of 20 to 30 mm. Hg, and the solid radical is dried under vacuum, to yield 152 g. of a faintly yellowish product which melts at 107° C. and contains 3.78 epoxide equivalents per kg.

Example 1

200 g. of 3-(3'4'-epoxycyclohexyl)-9,10-epoxy-2,4-dioxaspiro(5.5)undecane of the formula

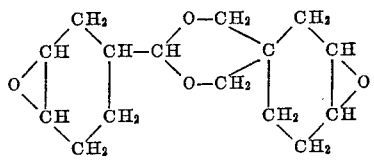

(containing 6.3 epoxide equivalents per kg.) and 20 g. of the titanium chelate (I) containing epoxide groups and corresponding to the formula

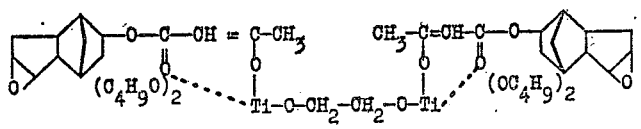

are heated in a 500 ml. three-necked flask equipped with internal thermometer and agitator on a waterbath for 6 hours and 15 minutes at 90° C. while being vigorously stirred. When the mass, which has turned very viscid, is allowed to cool, it can be comminuted in a mortar. It has a softening point of 60° C. to 65° C. (determined on a Kofler heater according to the method described in "Präparative Methoden der Polymeren-Chemie" of W. R. Sorenson and T. W. Campbell, Weinheim, 1962, p. 50) and contains 4.29 epoxide equivalents per kg. The product is soluble in acetone and can be used for the manufacture of glass fiber laminates in the following manner:

100 g. of the solid resin and 30 g. of phthalic acid anhydride are dissolved in 130 ml. of acetone and a glass fiber fabric (marketed under the trademark "AS$_1$-318," makers Fibers de Verre, Lausanne) is impregnated with this solution. By drying in air a non-tacky pre-impregnate containing 38% of resin is obtained. This pre-impregnate is cut up into 12 pieces 15 x 15 cm., which are stacked and pressed under a pressure of 10 kg./cm.$^2$ for one hour at 160° C. The losses due to excessive flowing when pressing at a high temperature have been considerably reduced by the prepolymerization; the catalyst left in the resin allows the press time to be shortened.

After the laminate sheet has cooled, specimens are cut off it and tested, whereupon they reveal the following properties:

Flexural strength _____ kg./mm$^2$ __ 37.8
Flexural strength after 1 hour's immersion in boiling water _____ kg./mm$^2$ __ 35.0
Heat distortion point according to Martens (DIN) _____ ° C __ 189

Example 2

A resin having a higher softening point and a lower content of epoxide groups is obtained thus:

The batch described in Example 1 is slowly heated within 2 hours to 150° C. on an oilbath while being vigorously stirred. After cooling, the dark-yellow resin can be pulverized; it has a softening point of 70° to 75° C. and contains 3.5 epoxide equivalents per kg. The product is only sparingly soluble in acetone, though pre-impregnates as described in Example 1 can be manufactured by dissolving the resin in trichlorethylene, dissolving the phthalic acid anhydride in acetone and combining these two solutions. The glass fiber laminates obtained by pressing the preimpregnates have substantially the same properties as the products of Example 1.

Example 3

100 g. of the diepoxide used in Example 1 and 8.2 g. of the aluminum chelate (II) which contains epoxide groups and corresponds to the formula

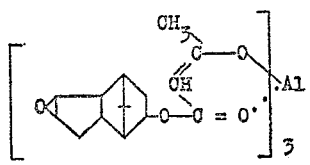

containing 3.78 epoxide equivalents per kg. are heated with vigorous stirring for 8 hours at 100° C. in a 250 ml. three-necked flask equipped with an internal thermometer and an agitator. The viscid mass is poured over a sheet of metal coated with a silicon mould lubricant and the whole is heated for another 14 hours at 100° C. in a heating cabinet. After cooling, the resin has become only faintly yellowish and can be pulverized. It has softening point of 65° to 70° C. and contains 4.49 epoxide equivalents per kg. This resin, like the resins described above, can be used for the manufacture of pre-impregnates for glass fiber laminates.

Example 4

200 g. of the diepoxide used in Example 1 and 7.2 g. of tetra - n - butyltitanate are heated for 1 hour with stirring at 100° C. in a 500 ml. three-necked flask equipped with an internal thermometer and an agitator; the agitator is then switched off and the content of the flask is heated for another 30 minutes at 100° C. The resin can be pulverized after cooling; it has a softening point of 68° C. and contains 3.74 epoxide equivalents per kg.

Example 5

100 g. of 6 - methyl - 3,4 - epoxy - cyclohexylcarboxylic acid - (6 - methyl - 3,4 - epoxy - cyclohexyl) methyl ester (containing 6.56 epoxide equivalents per kg.; marketed by Union Carbide Co. under the registered trade name "UNOX 201") and 5 g. of the titanium chelate (I) containing epoxide groups are heated in a 250 ml. three-necked flask with internal thermometer and agitator, for 30 minutes at 100° C. while being vigorously stirred. The batch is then poured over a metal sheet treated with a silicone mould lubricant and the coated metal sheet is heated for 20 hours at 100° C. in a heating cabinet. The resulting product has a softening point of 45° to 50° C. and contains 3.19 epoxide equivalents per kg.

Example 6

200 g. of the diepoxide used in Example 1 (containing 6.3 epoxide equivalents per kg.) are heated in a 500 ml. three-necked flask equipped with internal thermometer and agitator on an oilbath to 100° C. and then, while stirring vigorously, a solution of 4 g. of aluminum isopropylate in 4 ml. of toluene is added. At first, the reaction mixture turns slightly turbid, but after 5 to 10 minutes it becomes again clear. The temperature is then raised to 120° C. and thus maintained for 2 hours. The reaction mixture is then poured over a metal sheet treated with a silicone mould lubricant and cooled to room temperature. The resulting product can be powdered in a mortar. It has a softening point of about 70° C. and contains 3.87 epoxide equivalents per kg.

What is claimed is:

1. A process for the manufacture of a curable and fusible prepolymer which is soluble in organic solvents and has a residual content of 1,2 - epoxide groups, wherein a cycloaliphatic 1,2 - epoxy compound which has a softening point not exceeding about 50° C. and a 1,2-epoxide equivalency greater than 1, is heated at an elevated temperature in the presence of an organic metal compound that contains as the metalliferous grouping at least one radical selected from the group consisting of the radical of the formula

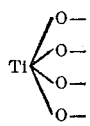

and the radical of the formula

until the desired polymerization degree has been reached, which desired polymerization degree is recognized by the diminution of the initial content of 1,2-epoxide groups in the reaction mixture not lower than to the point where the residual content of 1,2-epoxide groups is still great enough to allow the cure of the prepolymer, whereas the softening point of the initial 1,2-epoxy compound has been substantially raised, the reaction being interrupted at the latest before gelation of the reaction mixture sets in.

2. A process for the manufacture of a curable and fusible prepolymer which is soluble in organic solvents and has a residual content of 1,2-epoxide groups wherein a cycloaliphatic 1,2-epoxy compound which has a softening point not exceeding about 50° C. and a 1,2-epoxide equivalency greater than 1, is heated at an elevated temperature in the presence of a metal compound that contains as the metalliferous grouping at least one radical selected from the group consisting of the radical of the formula

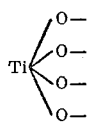

and the radical of the formula

and where the metal atom in said metalliferous grouping is incorporated by at least one coordinative side-valence bond as the central atom in an organic metal chelate compound, until the desired polymerization degree has been reached, which desired polymerization degree is recognized by the diminution of the initial content of 1,2-epoxide groups in the reaction mixture not lower than to the point where the residual content of 1,2-epoxide groups is still great enough to allow the cure of the prepolymer, whereas the softening point of the initial 1,2-epoxy compound has been substantially raised, the reaction being interrupted at the latest before gelation of the reaction mixture sets in.

3. A process as claimed in claim 1, wherein the metal compound used is a titanic acid ester.

4. A process as claimed in claim 2, wherein the metal compound used is a titanium containing chelate obtained by reacting a titanic acid ester with a member selected from the group consisting of β-dicarbonyl compounds and aceto acetates.

5. A process as claimed in claim 1, wherein the metal compound used is an aluminium alcoholate.

6. A process as claimed in claim 2, wherein the metal compound used is an aluminium containing chelate obtained by reacting an aluminium alcoholate with a member selected from the group consisting of β-dicarbonyl compounds and aceto acetates.

7. A process as claimed in claim 1, wherein the metal compound is used in an amount of 0.1 to 15% by weight, referred to the weight of the cycloaliphatic 1,2-epoxy compound.

8. A process as claimed in claim 1, wherein the prepolymerization is pushed to a stage where the content of 1,2-epoxide groups of the reaction product has dropped to 50% to 70% of the original content of 1,2-epoxide groups present in the initial 1,2-epoxy compound used as starting material.

9. A process as claimed in claim 1, wherein the reaction is carried out at a temperature ranging from about 80° to about 160° C.

References Cited
UNITED STATES PATENTS

| | | | |
|---|---|---|---|
| 2,822,348 | 2/1958 | Haslam | 260—2 |
| 2,866,761 | 12/1958 | Hill | 260—2 |
| 2,946,756 | 7/1960 | Wheelock et al. | 260—2 |
| 2,977,374 | 3/1961 | Phillips et al. | 260—2 |
| 3,210,379 | 10/1965 | Porret | 260—78.4 |

WILLIAM H. SHORT, *Primary Examiner.*

T. PERTILLA, *Assistant Examiner.*